US008769288B2

(12) United States Patent
Sundaram et al.

(10) Patent No.: US 8,769,288 B2
(45) Date of Patent: Jul. 1, 2014

(54) DISCOVERY OF SECURITY ASSOCIATIONS (75) Inventors: Ganapathy S. Sundaram, Hillsborough, NJ (US); Semyon B. Mizikovsky, Morganville, NJ (US)

(73) Assignee: Alcatel Lucent, Paris (FR)

(*) Notice: Subject to any disclaimer, the term of this patent is extended or adjusted under 35 U.S.C. 154(b) by 82 days.

(21) Appl. No.: 13/097,184

(22) Filed: Apr. 29, 2011

(65) Prior Publication Data
US 2012/0272064 A1 Oct. 25, 2012

Related U.S. Application Data (60) Provisional application No. 61/478,153, filed on Apr. 22, 2011.

(51) Int. Cl.
*H04L 9/32* (2006.01)
*H04L 9/00* (2006.01)
(52) U.S. Cl.
USPC .......................................... 713/171; 380/277
(58) Field of Classification Search
USPC .......................................... 713/171; 380/277
See application file for complete search history.

(56) References Cited

U.S. PATENT DOCUMENTS

| 5,937,066 | A  | * | 8/1999  | Gennaro et al. ............ 380/286 |
| 6,052,469 | A  | * | 4/2000  | Johnson et al. ............ 380/286 |
| 6,058,188 | A  | * | 5/2000  | Chandersekaran et al. .. 380/286 |
| 6,061,454 | A  | * | 5/2000  | malik et al. .............. 380/278 |
| 6,246,771 | B1 | * | 6/2001  | Stanton et al. ............ 380/286 |
| 8,301,883 | B2 | * | 10/2012 | Sundaram et al. .......... 713/163 |
| 2002/0007453 | A1 | * | 1/2002 | Nemovicher ............. 713/155 |
| 2003/0012387 | A1 | * | 1/2003 | Gilbert et al. ............. 380/286 |
| 2003/0051158 | A1 |   | 3/2003 | McKibben et al. |
| 2004/0255126 | A1 | * | 12/2004 | Reith ................... 713/183 |
| 2005/0063544 | A1 | * | 3/2005 | Uusitalo et al. ........... 380/277 |

(Continued)

FOREIGN PATENT DOCUMENTS

GB 2376392 12/2002
WO PCTUS2012032031 6/2006

OTHER PUBLICATIONS

F. Andreasen et al., "Session Description Protocol (SDP) Security Descriptions for Media Streams," Network Working Group, Request for Comments: 4568, Jul. 2006, 44 pages.

(Continued)

*Primary Examiner* — Techane Gergiso
(74) *Attorney, Agent, or Firm* — Ryan, Mason & Lewis, LLP (57) ABSTRACT

Techniques are disclosed for discovering security associations formed in communication environments. For example, a method for forming a discoverable security association between a first computing device (e.g., a first client) and a second computing device (e.g., a second client) comprises the following steps. The first computing device is provided with a seed that is used by the first computing device to generate a secret that is used by the first computing device to compute a key for use in securing communications with the second computing device. The secret is re-computable based on knowledge of the seed and the key is re-computable based on knowledge of the secret such that a third computing device (e.g., an intercepting server) can use the re-computed key to intercept communications between the first computing device and the second computing device unbeknownst to the first computing device and the second computing device. By way of example, the key may be a result of an identity based authenticated key exchange.

22 Claims, 8 Drawing Sheets

(56) References Cited

U.S. PATENT DOCUMENTS

| | | | |
|---|---|---|---|
| 2005/0198489 A1* | 9/2005 | Wallace et al. | 713/151 |
| 2005/0246760 A1* | 11/2005 | Kaler et al. | 726/1 |
| 2007/0250712 A1* | 10/2007 | Salgado et al. | 713/171 |
| 2007/0297418 A1* | 12/2007 | Lee | 370/395.52 |
| 2008/0114983 A1* | 5/2008 | Sherkin et al. | 713/171 |
| 2008/0276294 A1* | 11/2008 | Brady | 726/1 |
| 2009/0016526 A1* | 1/2009 | Fiatal et al. | 380/255 |
| 2009/0055648 A1* | 2/2009 | Kim et al. | 713/171 |
| 2009/0300749 A1* | 12/2009 | Delia et al. | 726/12 |
| 2010/0211779 A1 | 8/2010 | Sundaram | |
| 2011/0051912 A1 | 3/2011 | Sundaram et al. | |
| 2011/0055567 A1* | 3/2011 | Sundaram et al. | 713/169 |
| 2011/0138451 A1* | 6/2011 | Solis et al. | 726/7 |
| 2013/0238903 A1* | 9/2013 | Mizunuma | 713/176 |

OTHER PUBLICATIONS

C. Neuman et al., "The Kerberos Network Authentication Service (V5)," Network Working Group, Request for Comments: 4120, Jul. 2005, 138 pages.

J. Mattsson et al., "Mikey-Ticket: Ticket-Based Modes of Key Distribution in Multimedia Internet KEYing (MIKEY)," Internet Engineering Task Force (IETF), Request for Comments: 6043, Mar. 2011, 58 pages.

M. Bellare et al., "Entity Authentication and Key Distribution," Proceedings of the 13th Annual International Cryptology Conference on Advances in Cryptology, Lecture Notes in Computer Science, 1994, 29 pages, vol. 773.

T. Dierks et al., "The TLS Protocol Version 1.0," Network Working Group, Request for Comments: 2246, Jan. 1999, 80 pages.

V. Cakulev et al., "IBAKE: Identity-Based Authenticated Key Exchange," Internet-Draft (IETF), Apr. 2011, 17 pages.

V. Kolesnikov et al., "Hybrid Identity Based Authenticated Key Exchange Protocols," Bell Labs Technical Memorandum, 2011, 13 pages.

E. Rescorla, "Diffie-Hellman Key Agreement Method," Network Working Group, Request for Comments: 2631, Jun. 1999, 13 pages.

W. Diffie et al., "New Directions in Cryptography," IEEE Transactions on Information Theory, Nov. 1976, pp. 644-654, vol. 22, No. 6.

G. Appenzeller et al., "Identity-Based Encryption Architecture and Supporting Data Structures," Network Working Group, Request for Comments: 5408, Jan. 2009, 30 pages.

M. Burmester et al., "A Secure and Efficient Conference Key Distribution System," Proceedings of Eurocrypt, Advances in Cryptology, Lecture Notes in Computer Science, 1994, pp. 275-286, vol. 950.

D. Boneh et al., "Identity-Based Encryption from the Weil Pairing," Proceedings of Crypto, Lecture Notes in Computer Science, 2001, pp. 213-229, vol. 2139.

T. Dierks et al., "The Transport Layer Security (TLS) Protocol Version 1.1," Network Working Group, Request for Comments: 4346, Apr. 2006, 87 pages.

T. Dierks et al., "The Transport Layer Security (TLS) Protocol Version 1.2," Network Working Group, Request for Comments: 5246, Aug. 2008, 104 pages.

L. Martin et al., "Using the Boneh-Franklin and Boneh-Boyen Identity-Based Encryption Algorithms with the Cryptographic Message Syntax (CMS)," Network Working Group, Request for Comments: 5409, Jan. 2009, 13 pages.

"FIPS Publication 180—Federal Information Processing Standards Publication," U.S. Department of Commerce/National Institute of Standards and Technology, Secure Hash Standard, Apr. 1995, 24 pages.

D. Eastlake, 3rd et al., "US Secure Hash Algorithm 1 (SHA1)," Network Working Group, Request for Comments: 3174, Sep. 2001, 22 pages.

* cited by examiner

- GROUP KEY = $Na_i(Z_{i-1}) + (N-1)X_i + (N-2)X_{i+1} + .... + X_{i-2}$

- GROUP KEY NOT KNOWN TO THE CONFERENCE SERVER

USERS CORRESPOND WITH CONFERENCE SERVER DURING KEY EXCHANGE

- EACH USER INDIVIDUALLY EXECUTES IBAKE WITH CONFERENCE SERVER
  - LET $Z_i = a_i P$ BE THE VALUE SENT BY USER "i" TO SERVER DURING AUTHENTICATION WITH SERVER
- AFTER AUTHENTICATION SUCCESS
  - CONFERENCE SERVER SENDS THE SET $\{a_i P\}$ TO EVERYBODY (EITHER BROADCAST OR INDIVIDUAL UNICAST)
  - EVERY USER INDIVIDUALLY SENDS BACK $X_i = a_i(a_{i+1}P - a_{i-1}P)$ TO THE SERVER

DISCOVERY OF SECURITY ASSOCIATIONS

The present application claims priority to the U.S. provisional patent application identified as Ser. No. 61/478,153, filed on Apr. 22, 2011, and entitled "Out-of-Band Lawful Discovery of Security Associations," the disclosure of which is incorporated by reference herein in its entirety.

FIELD OF THE INVENTION

The present invention relates generally to communication security and, more particularly, to techniques for discovering security associations in communication environments.

BACKGROUND OF THE INVENTION

Internet Protocol (IP) communications and telephony systems have gained wide spread adoption. One of the first examples of end-to-end IP communications between two clients included Instant Messaging, but this was soon followed by Voice-over-IP and now many providers (e.g., network operators and application providers) offer end-to-end Video-over-IP. However, these trends were largely restricted to wired fixed networks, given that wireless mobile network access has been dominated by narrow-band circuit switched access networks. However, the recent deployment of broadband 4G (fourth generation) wireless networks sets the stage for all forms of multimedia over IP communications end-to-end, independent of access type.

With the transition towards end-to-end IP sessions, the market has witnessed a resurgence in interest as well as an awareness for security and privacy over these open IP networks. As a first step, end-to-end encryption and authentication are paradigms that are gaining wide attention. While contemporary Internet transactions involving commerce and Enterprise Intranet access have been secured end-to-end for over a decade now, securing conversational applications over IP have been largely left to the application provider, e.g., SKYPE™ (trademark of Skype Technologies S.A. of Luxembourg).

With the advent of all IP networks, it is becoming increasingly necessary for network operators or others who offer voice, video, and messaging services to provide security end-to-end while complying with requirements to support legal interception and discovery of security associations. Such legal interception and discovery of security associations may be necessary for law enforcement purposes, or simply for some non-law enforcement purpose, whereby it is necessary or desirable to be able to decrypt encrypted messages transmitted between parties and/or devices.

SUMMARY OF THE INVENTION

Principles of the invention provide techniques for discovering security associations formed in communication environments.

For example, in one aspect of the invention, a method for forming a discoverable security association between a first computing device and a second computing device comprises the following steps. The first computing device is provided with a seed that is used by the first computing device to generate a secret that is used by the first computing device to compute a key for use in securing communications with the second computing device. The secret is re-computable based on knowledge of the seed and the key is re-computable based on knowledge of the secret such that a third computing device can use the re-computed key to intercept communications between the first computing device and the second computing device unbeknownst to the first computing device and the second computing device.

By way of further example, in a second aspect of the invention, a method for discovering a security association formed between a first computing device and a second computing device comprises the following steps. A third computing device obtains a secret from a fourth computing device. The secret is the same secret generated by the first computing device, wherein the first computing device generated the secret based on a seed provided thereto by the fourth computing device and wherein the first computing device used the seed to generate the secret and used the secret to compute a key for use in securing communications with the second computing device. The third computing device re-computes the key based on the secret in order to intercept communications between the first computing device and the second computing device unbeknownst to the first computing device and the second computing device.

Illustrative principles of the invention provide methodologies to lawfully discover security associations, including but not limited to keys and other cryptographic data, for end-to-end encrypted sessions, using techniques that are particularly applicable to, but not limited to, systems that rely on public key methods for key management. For example, techniques of the invention may be used in accordance with systems and protocols that implement an asymmetric mutually authenticated key exchange and/or any Diffie-Hellman based key exchange. In particular, the inventive overlay procedure is undetectable while satisfying various compliance requirements. It is to be appreciated that while principles of the invention are particularly suitable to an Internet Protocol Multimedia Subsystem (IMS) environment, the invention is not intended to be so limited. That is, principles of the invention are generally applicable to any suitable communication system in which it is desirable to provide lawful security association discovery features. By way of example only, another communication system in which such inventive techniques may be applied is a conference calling system based on an IMS signaling framework or any other signaling framework.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The phrase "multimedia communication system" as used herein is generally defined as any communication system capable of transporting, over a media plane, one or more types of media involving, but not limited to, text-based data, graphics-based data, voice-based data and video-based data.

The phrase "media plane" as used herein is generally defined as the functional portion of the multimedia communication system in accordance with which the one or more types of media are exchanged between two or more parties in a call session. This is in contrast with a "control plane" which is the functional portion of the multimedia communication system in accordance with which call negotiation/scheduling is performed in order to establish the call session. Examples of media plane applications with which the inventive techniques can be used include, but are not limited to, Voice-over-IP (VoIP), Instant Messaging (IM), Video/Audio IM, Video Share, and Video-over-IP. It is understood that the media plane contains application layer traffic. However, the lawful security association discovery techniques of the invention can be applied to any plane or layer of a communication system.

The term "key" as used herein is generally defined as an input to a cryptographic protocol, for purposes such as, but not limited to, entity authentication, privacy, message integrity, etc.

The phrase "security association" as used herein generally refers to a security definition in a communication environment across which two or more parties and/or devices communicate. In one example, the security definition may include, but is not limited to, a session key.

The term "seed" as used herein generally refers to a set of numbers comprising at least one random number.

A "client" as used herein may generally refer to a communication device or some other computing system or device that allows one or more users, parties or entities to communicate in a communication environment with one or more other communication devices or other computing systems, such as another client. A "client" as used herein may also generally refer to an application or other computer program on a computing device. Thus, while the term client may be referred to below as a device, it is to be understood that the term client is not limited to hardware but may be software, or a combination thereof.

A "communication session" as used herein generally refers to a connection between at least two communication devices or other computing systems (e.g., clients) for the purpose of communication between the two devices. Thus, an "end-to-end" communication session as used herein generally refers to the entire connection path from one device (e.g., client) to the other device (e.g., client). Also, the two or more clients that are participating in the communication session are referred to as "end-point devices" or simple "end-points." However, the lawful security association discovery techniques of the invention can be applied to any computing or communication device, and not just to a client.

An "application" (or "application program") as used herein generally refers to one or more computer programs which, when executed, perform one or more given functions.

The term "lawful" as used herein is generally defined as satisfying one or more compliance requirements or guidelines associated with a governmental or private authoritative entity. Such authoritative entity may serve a law enforcement function or a non-law enforcement function. That is, the term lawful is not intended to be limited to law enforcement but rather may also include compliance in a non-law enforcement sense.

For ease of reference, the detailed description is divided as follows. Section I describes illustrative use cases and providers for which principles of the invention may be applied. Section II describes existing end-to-end key management methodologies. Section III describes existing key resolution methodologies. Section IV describes lawful security association discovery solutions according to illustrative principles of the invention in an Internet Protocol (IP) Multimedia Subsystem (IMS) environment context. Section V describes lawful security association discovery solutions according to illustrative principles of the invention in a conference calling environment context. Section VI describes an illustrative computing system for implementing one or more lawful security association discovery methodologies according to the invention.

I. Illustrative Use Cases and Providers

The illustrative use cases described herein to which principles of the invention may be applied comprise an end-to-end encrypted client to client communications session. By way of example only, and not intended to be limiting in any way, such use cases include:

1. Text based IM or Instant Messaging applications.
2. Multimedia Messaging applications (including Audio and/or Video) that are based on the Internet Protocol end-to-end.
3. Voice over IP, over various packet switched access networks.
4. Video over IP, over various packet switched access networks.
5. Conferencing of text and multi-media applications involving a group of participants.

These illustrative use cases apply equally well to various providers. By way of example, one can categorize providers into three categories:

1. Provider of the service could be an Enterprise (where the chief information officer or CIO controls the roll-out, administration, and operation of the application). Observe that an Enterprise could be a corporate or government entity.
2. Provider of the service could be an Application Provider (e.g., Skype, Googletalk, etc.) and such services are offered "over the top" across networks and types.
3. Provider of the service could be a network provider (e.g., Verizon Wireless, AT&T, Sprint, T-Mobile, Vodafone, etc.).

The illustrative scope of the problem and the solutions described in accordance with principles of the invention apply equally well to all providers and in particular are agnostic to the end-to-end communication type or application.

II. End-to-End Key Management

Given an end-to-end IP session, and the desire to provide security end-to-end, end-to-end key management schemes have been devised. By way of example, one can categorize such schemes into four categories: (1) client based key transfer protocol; (2) network assisted key transfer protocol; (3) symmetric mutually authenticated key exchange protocol; and (4) asymmetric mutually authenticated key exchange protocol.

Figure 1:
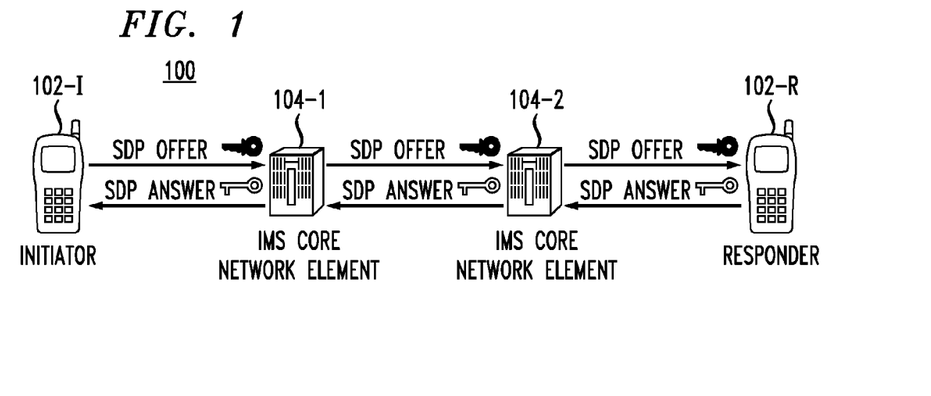
FIG. 1 illustrates a client based key transfer methodology.

(1) Client based key transfer protocol. As shown in protocol 100 of FIG. 1, a client device 102-I referred to as the "initiator" (i.e., the client that initiates a particular communication session) uses an established hop-by-hop secure messaging scheme that is applicable to secure signaling to transfer a "security key" to a client device 102-R referred to as the "responder" (i.e., the client that responds to the initiator of the particular communication session) across one or more network elements 104-1, 104-2. Then, all parties in the communication session use that key (or a derivation thereof) to secure that session. The example shown in FIG. 1 is based on the Session Description Protocol (SDP) which is a protocol used to negotiate a key for the Secure Real-time Transport Protocol, see, e.g., Session Description Protocol (SDP) Internet Engineering Task Force (IETF) Request for Comment (RFC) 4568, "Security Descriptions for Media Streams," July 2006, the disclosure of which is incorporated by reference herein in its entirety. In such a case, client 102-I sends an SDP offer across the network (end-to-end) to client 102-R, and client 102-R responds with an SDP answer, thereby establishing the security key used to secure the communications associated with that particular session.

Figure 2:
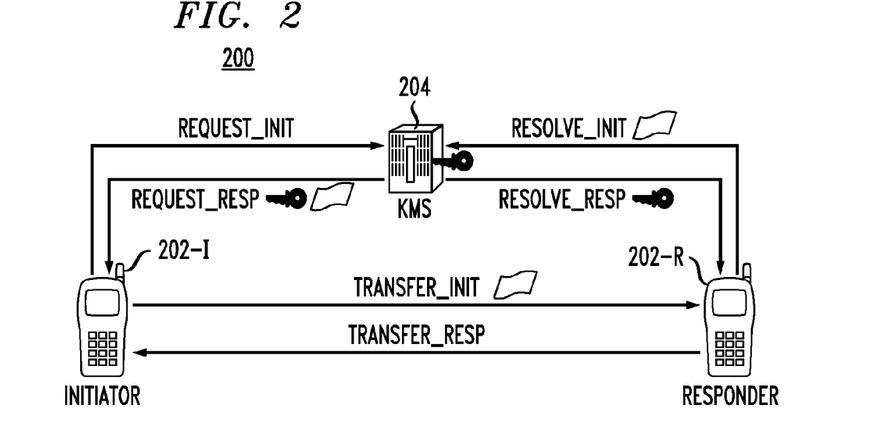
FIG. 2 illustrates a network assisted key transfer methodology.

(2) Network assisted key transfer protocol. As shown in protocol 200 of FIG. 2, client device 202-I (initiator) requests a key for the given session from a server 204 (key management server or KMS) in the provider network (or datacenter), followed by the delivery of the key and a "pointer" to the key (in the form of a ticket or token) from the server 204 to the initiator. The initiator then securely shares the "pointer" with client device 202-R (responder) using an established hop-by-hop security association, following which the responder obtains the key from the server 204 by presenting the "pointer" thereto. Two examples of such a network assisted protocol include the Kerberos system described in IETF RFC 4120, "Kerberos Network Authentication Service," July 2005, and the MIKEY-Ticket system described in IETF RFC 6043, "Ticket-based Modes of Key Distribution in Multimedia Internet Keying," March 2011, the disclosures of which are incorporated by reference herein in their entireties.

Figure 3:
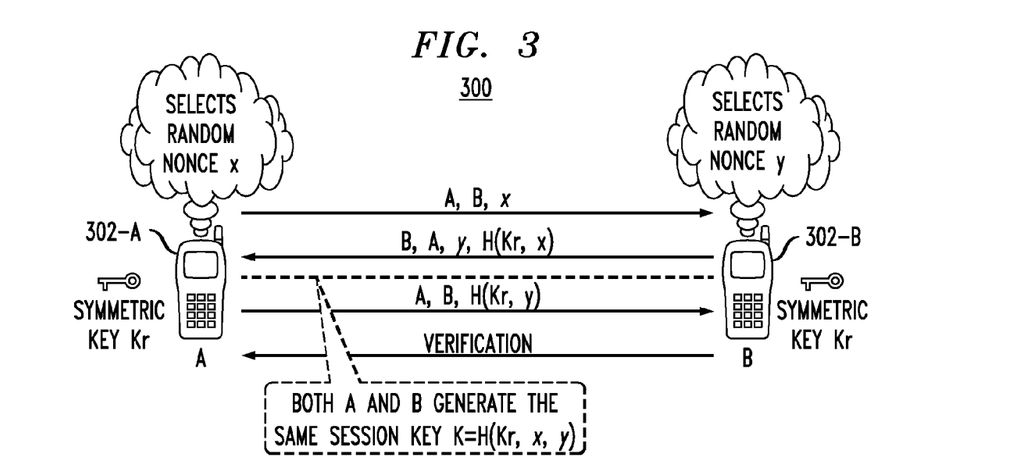
FIG. 3 illustrates a symmetric mutually authenticated key exchange methodology.

(3) Symmetric mutually authenticated key exchange protocol. As shown in protocol 300 of FIG. 3, the initiator (302-A) and the responder (302-B) share a symmetric key, which they then use to execute a mutually authenticated key exchange protocol involving random numbers and/or synchronized counters. One example of such a protocol is described in M. Bellare and P. Rogaway, "Entity Authentication and Key Distribution," Advances in Cryptology, Crypto '93, LNCS 773, Ed. D. Stinson, Springer-Verlag, 1994, the disclosure of which is incorporated by reference herein in its entirety.

Figure 4:
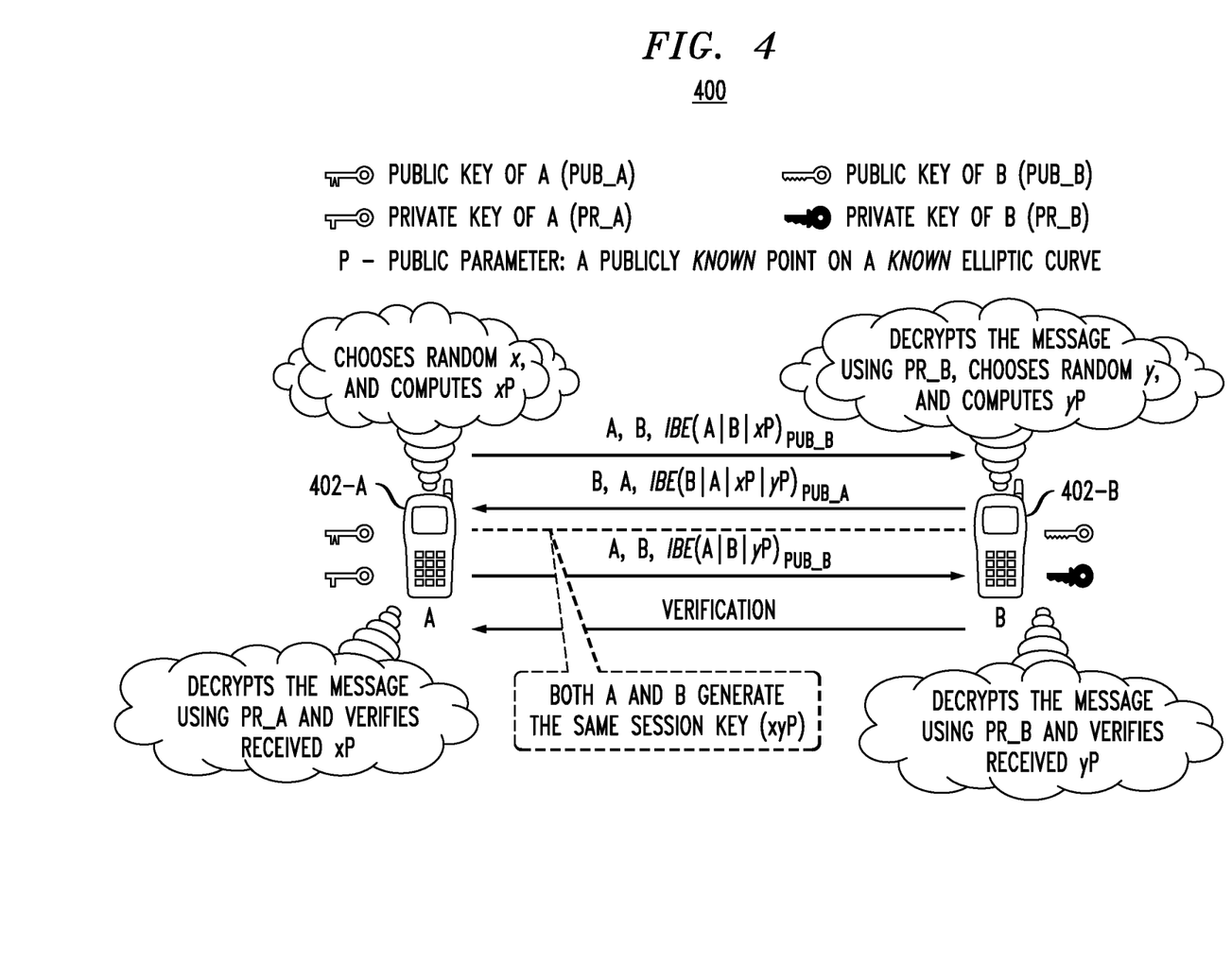
FIG. 4 illustrates an identity based authenticated key exchange methodology.

(4) Authenticated key exchange using asymmetric public key protocol. In this type of protocol, the initiator and responder each possess a pair of keys (private and public). Typical examples involve the use of their private keys to authenticate but public keys to address each other, along with public key methods for key exchange. Protocol 400 of FIG. 4 shows the IBAKE (identity based authenticated key exchange) protocol and the use of asymmetric public key methods. The IBAKE protocol is described in the U.S. patent application identified by Ser. No. 12/372,242, filed on Feb. 17, 2009, the disclosure of which is incorporated by reference herein in its entirety.

As shown in protocol 400 of FIG. 4, the IBAKE protocol defines mutual authentication and key exchange between two end-points: initiator A (client 402-A) and responder B (client 402-B). Both the initiator and the responder each have a pair of keys, i.e., their public and private keys, respectively. As is the case with public key cryptography, the public key is used for encryption and the private key is used for decryption. A fundamental difference between standard public key methods and identity based public key methods is that, in the latter, the public key corresponds to the "identity" and the corresponding private key is generated by a trusted server (called the Key Management Server or KMS).

The main concept of the illustrated protocol is that the initiator and responder authenticate each other and generate a session key using the private keys provided by the Key Management Server (not shown), but yet the server cannot determine the session key.

Observe in FIG. 4 that the initiator A chooses a random secret "x" and computes the value "xP" (where P is a point on an Elliptic Curve over a finite field) before sending "xP" over to the responder B. Similarly, the responder chooses a random secret "y" and computes the value "yP" before sending "yP" over to the initiator A. Using "x" and "yP," the initiator computes "xyP"; similarly using "y" and "xP" the responder computes "xyP." This allows both parties to agree on a key for the communication session. However, the Key Management Server (KMS) has access to "xP" and "yP" but cannot compute "xyP."

It is realized that, in all of the above enumerated (four) key transfer/exchange protocols, independent of the communications type or provider, there are regulatory and/or compliance requirements by which the provider may be legally required to discover and share the end-to-end security keys (referred to as "lawful discovery").

This requirement can be relatively easily satisfied for protocol types 1 and 2. In protocol type 1(FIG. 1), the security key of interest is transported between nodes of the network with the hop-by-hop protection, and therefore is known to the network nodes involved in the transport (e.g., network elements 104-1, 104-2 of FIG. 1). In protocol type 2 (FIG. 2), the session key is generated by a server (e.g., KMS 204 of FIG. 2) and hence available to the provider.

In protocol type 3 (FIG. 3), typically, the provider is involved in provisioning these pair-wise shared secrets and hence is aware of these secrets. In such instances, it is fairly straightforward for the provider to discover session keys and satisfy legal and compliance requirements.

But this lawful discovery problem is particularly challenging for protocol type 4 (FIG. 4), when the provider is only an enabler to the key management transaction but not a participant in the transaction. In short, the problem is to discover the end-to-end security key, particularly when an asymmetric public key protocol is used for end-to-end key management. Furthermore, such discovery is required to be unobtrusive and undetectable during the communications session.

III. Key Resolution in Asymmetric Public Key Protocols

This section describes existing methods of key resolution in asymmetric public key protocols for end-to-end key management.

(1) Generic Protocol Description

We specifically focus here on protocols that utilize Diffie-Hellman type key exchange (see, e.g., IETF RFC 2631, "Diffie-Hellman Key Agreement Method," June 1999, the disclosure of which is incorporated by reference herein in its entirety). We describe the protocol as was described classically by Diffie and Hellman in their landmark paper (W. Diffie, M. Hellman, "New Directions in Cryptography," IEEE Transactions on Information Theory, vol. IT-22, November 1976, pp: 644-654, the disclosure of which is incorporated by reference herein in its entirety) over the multiplicative group of a finite field modulo a prime number p. However, it is well known that the Diffie-Hellman protocol can be extended to any group, but the security of the protocol relies on the properties of the group.

In this protocol, each of two end-points (A and B) selects publicly known values for G (Generator) and P (large Prime number) such that G is a generator of the multiplicative group of nonzero integers modulo the large prime P.

To execute the protocol, A chooses a random secret x and computes a=G^x(modP). Similarly, B chooses a random secret y and computes b=G^y(modP). It is to be appreciated that the secrets x and y are random positive integers less than P.

A then sends the value a to B, and B sends the value b to A.

Upon receiving value b, A computes k=b*x (mod P), similarly, upon receiving value a, B computes k=a*y (mod P). It is easy to see that k=(a)*y (mod P)=(b)*x (mod P), and k is the mutually computed common session key.

(2) Special Use of Diffie-Hellman in IBAKE

The IBAKE protocol (illustrated in FIG. 4) utilizes the group of points on an elliptic curve over a finite field, and hence relies on the corresponding Diffie-Hellman problem over the group of points in an elliptic curve over a finite field. Each end-point (e.g., A) has a known public identity, which can be used by any other end-point (e.g., B) to create the public key for A (PUB_A). Similarly, knowing the public identity of B, any other end-point can create PUB-B.

Occasionally and periodically, each end-point (e.g., A) contacts the special network-based function, Key Management Sever (KMS), and receives the specially computed private key (e.g., PR_A) computationally associated with the corresponding public key (PUB-A). Similarly, other end-points do the same. As a result, each end-point possesses the public-private key pair, while the public key is based on the end-point's identity.

To execute the protocol, each end-point chooses a random secret number. Let x be a random number chosen by A, and let y be a random number chosen by B.

In the first step, A computes xP, where P is the publicly known point on the elliptic curve E (i.e., P added to itself x times using the addition law), encrypts it using B's public key PUB_B, and transmits it to B. In this step, encryption refers to identity based encryption described in Dan Boneh, Matthew K. Franklin, "Identity-Based Encryption from the Weil Pairing" Advances in Cryptology—Proceedings of CRYPTO 2001 (2001), and in IETF RFCs 5408 and 5409, the disclosures of which are incorporated by reference herein in their entireties.

Upon receipt of the encrypted message, B decrypts the message and obtains xP.

Subsequently B computes yP, and encrypts the pair {xP, yP} using A's public key PUB_A, and then transmits it to A.

Upon receipt of this message, A decrypts the message and obtains yP. Subsequently, A encrypts yP using B's public key and sends it back to B.

Following this, both A and B compute k=xyP as the session key. To be specific, A computes k=xyP by adding received and decrypted yP to itself x times, Similarly, B computes k=xyP by adding received and decrypted xP to itself y times.

(3) Man-In-The-Middle Key Resolution for Lawful Discovery of Session Keys

A typical and well known method for key discovery for Diffie-Hellman key exchange is based on the so-called "man-in-the-middle" (MitM) method. In this method, the active intermediary C places itself in a communication link between end-points A and B. The intermediary C presents itself as B to A, and as A to B.

Intermediary C creates its own secrets, x' and y'. When C receives a from A, it responds with b'=G^y'(modP), and similarly sends a'=G^x'(modP) to B.

When the exchange is completed, A and C generate k1= (G^x(modP))*y'(mod P)=(G^y'(modP))*x) (mod P), while C and B generate k2=(G^x'(modP))*y (mod P)=(G^y(modP)) *x' (mod P). As a result, by maintaining two independent secure sessions with A and B, the active intermediary C is able to decrypt and re-encrypt communications between A and B.

However, it is possible for some sophisticated end-point devices to exchange either an image or a signature representation of a mutually computed key, and realize that they computed in fact two different keys. This would lead to discovery of the MitM function, which is undesirable in a lawful discovery of session keys.

Figure 5:
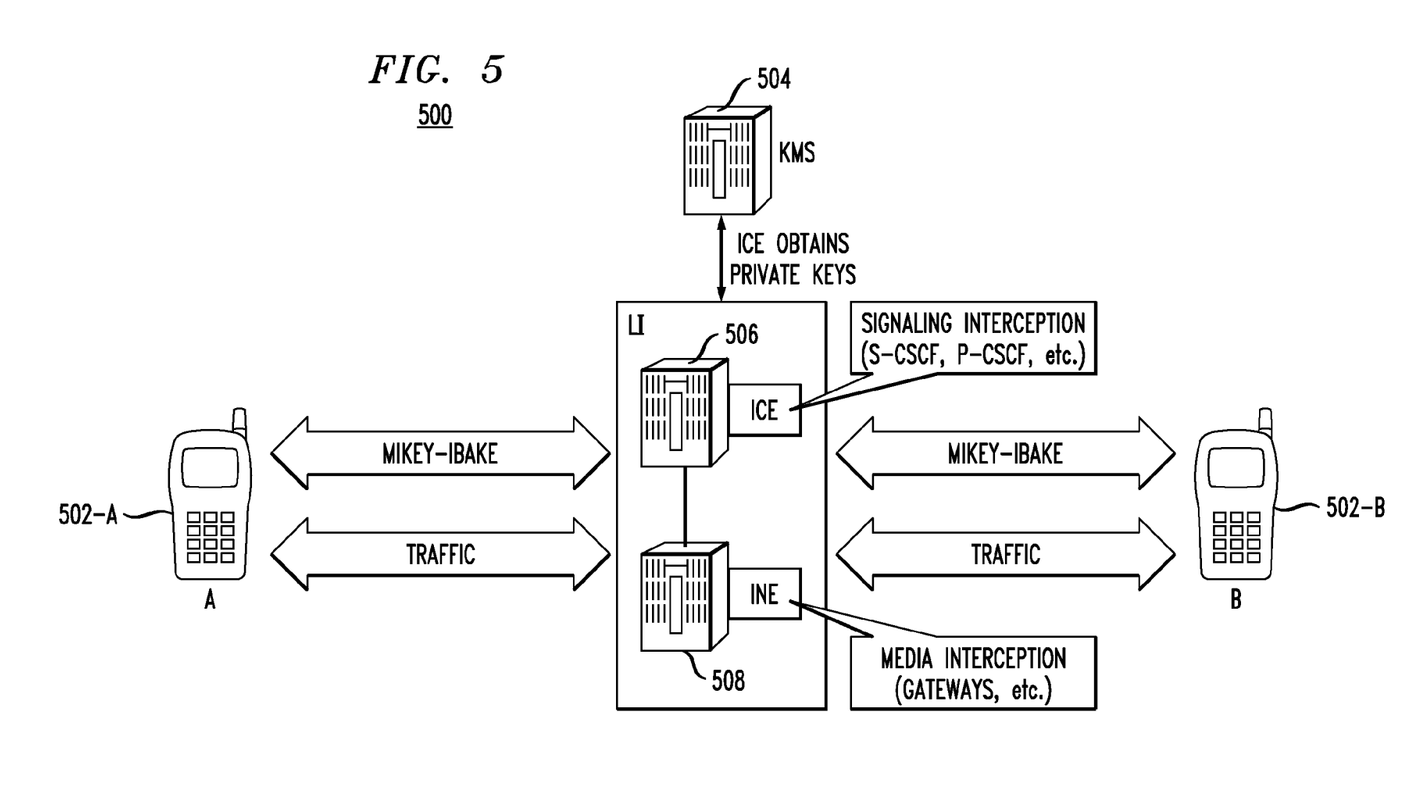
FIG. 5 illustrates a man-in-the-middle key discovery methodology.

FIG. 5 shows protocol 500 where the MitM method is used between client 502-A and client 502-B. Note that the lawful interception (LI) is attempted by intercepting control element (ICE) 506 which intercepts signaling between the two end-point devices and intercepting network element (INE) 508 which intercepts media between the two end-point devices. Note how the ICE obtains the necessary private keys (e.g., PR_A and PR_B) from KMS 504. However, as mentioned above, such an LI functionality may be detectable by certain sophisticated end-point devices.

(4) Key Resolution by Forced Creation of Secret

Another method forces at least one of the end-points (for instance, A) to create the secret (x) which is also known to the specialized network node involved in lawful discovery of session keys. In this scheme, the end-point A does not choose a secret x, but rather waits for the network to send it a special parameter such as nonce (N), and then hashes this nonce together with another secret (S) that it shares with the network. As the result, both the end-point A and the specialized network node generate x=H(S, N). Subsequently, this generated x is used as the exponent in the Diffie-Hellman exchange.

It can be easily seen that the specialized network node can compute k=(G^y(modP))*x (mod P), and therefore becomes privy to the secret key of the communication link between A and B.

However, by expecting to receive the nonce, the end-point device is made fully aware of the presence and intentions of the network to lawfully discover the session key, which is extremely undesirable. In particular, this key discovery solution is detectable by the colluding end-point device during the communication session and furthermore works only if there is a colluding end-point device.

(5) Key Transfer to the Escrow Server

Yet another method is based on a special request that is sent to the end-point device from the network node. This request forces the end-point device to upload the computed key k or its derivative used for ciphering the A-B communications link to a network-based key escrow database. This upload is usually done under protection with the secure tunnel established between the end-point and the key escrow database.

However, the end-point device receiving such request clearly realizes the presence of the key escrow database and, therefore, possible interception of the secure communications, which for the purpose of lawful discovery of session keys is not desirable.

IV. Improved Lawful Security Association Discovery

In accordance with an illustrative embodiment of the invention, a solution to the key discovery problem is provided which relies on the provider discovering the "random secret" of at least one participant in the communications session. In particular, the method (which will be described in greater detail below) works as follows.

A pseudo-random number generator (PRG) is included (e.g., embedded) in the client application. This could be done by the provider, but it could be done by another entity, for example, the application developer or author. In the case of the latter scenario, the provider is made aware of the PRG included in the client application.

The network operator or application owner, e.g., enterprise, provisions the application with the secret random seed (S) that is associated with the client identity. This random seed is typically a random number, or more generally, a set of numbers which includes at least one random number. The seed can further be updated as often as needed and the inventive solution is immune to the method used to provision the seed or how often the seed is updated.

This association, i.e., the seed and identity, is stored in a server managed by the network operator or application owner, e.g., enterprise. Also, we allow for the seed for a given identity to be updated if need be but any updates to the client will also need to be performed at the server.

When the application needs to generate the random number (a secret) for the session (e.g., x) in order to execute a key exchange protocol, such as Diffie-Hellman, IBAKE, etc., the PRG is invoked. The PRG uses the seed and a deterministic and monotonically increasing quantity (value), such as a time stamp or externally managed counter (C), to generate the required pseudo-random value x. It is to be understood that the value could be any type of monotonically incrementing value, such as a session counter, a time stamp, or a simple counter value that has its own rules of reset or increments, etc. The criterion is that it does not repeat from session to session for the same device for the lifetime of the seed.

Figure 6:
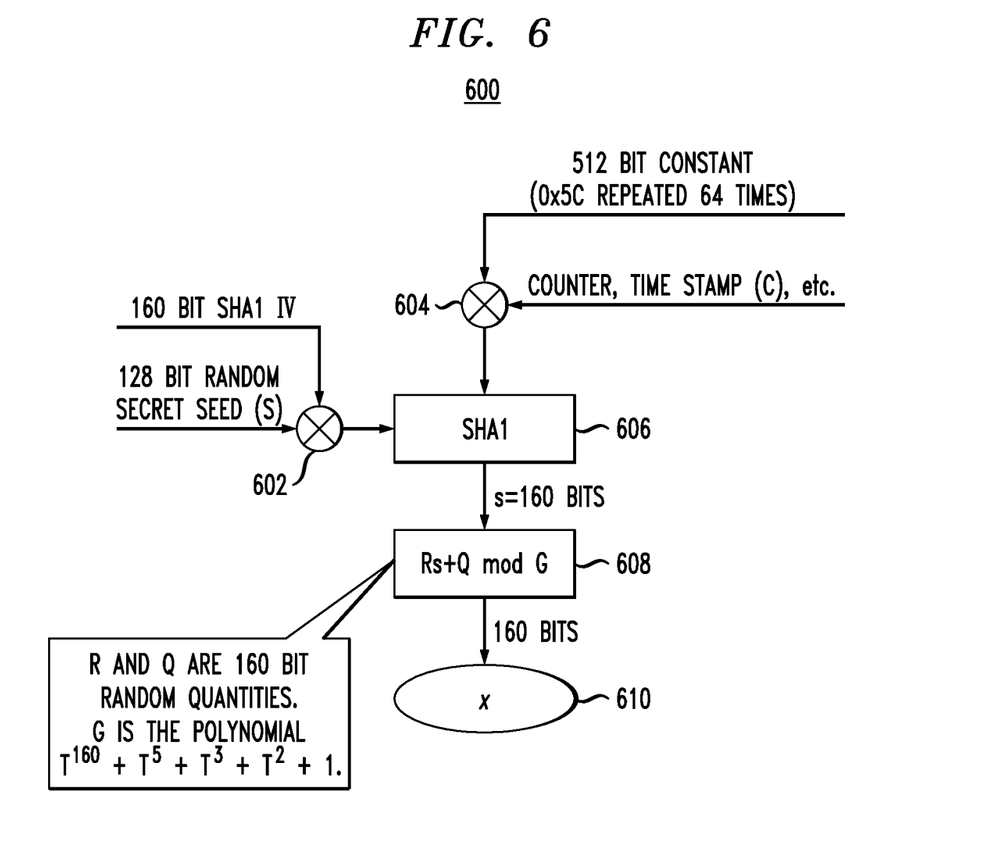
FIG. 6 illustrates a pseudo-random generator according to an embodiment of the invention.

FIG. 6 illustrates a pseudo-random generator 600 according to an embodiment of the invention. As shown in this illustrative embodiment, the PRG is based on a SHA1 algorithm defined in FIPS publication FIPS 180-1, "Secure Hash Standard," April 1995, the disclosure of which is incorporated by reference herein in its entirety. It is to be understood, however, that principles of the invention are not limited to this particular algorithm.

In order to generate the pseudo-random x, the 128-bit random preconfigured seed (S) is XORed (logic exclusive OR function in 602) with a conventional Initial Vector (IV) specified for SHA1 algorithm.

The time stamp or an externally managed monotonically increasing counter (C), optionally XORed (in 604) with another pre-configured constant (e.g., 512 bit constant), is applied as the "message" to the input of SHA1 (in 606). The 160 bit value s resulting from the execution of SHA1 is additionally "whitened" with the Rs+Q mod G function (in 608) to ensure equal hardness of each bit of s, and the resulting 160 bit value x (610) is output to the Diffie-Hellman-type protocol. Here, the R and Q are publicly known pre-selected large polynomials with coefficients in a binary field, and G is the polynomial $(T^{160}+T^5+T^2+1)$. Alternatively, any finite field could be used (not just a binary field), and any irreducible polynomial over this finite field could be use (not just the specific G suggested above). More generally, any whitening function could be used (not just linear congruential hash functions Rs+Q mod G) to extract hard bits.

Each instance of the secure communication client application is tracked using a serial number or client identity. For example, Alice@abcenterprise.com receives an instance of the secure communications client software from "abc enterprises," which includes a serial number (or Alice's identity). The provider keeps track of the associated pre-configured random seed S and the monotonically increasing counter value C, such as system time. This will allow the provider to re-generate the same random number that Alice produces during the key exchange session with anyone else.

When there is a legal requirement to discover the key and intercept the conversation, the provider then proceeds to record the encrypted communication session along with the key exchange session that preceded it. An offline server then computes the random secret that was used by the initiator (or responder(s)) in the key exchange protocol to compute the group element that was exchanged. Advantageously, this allows the offline server to calculate the same session key that was calculated by the initiator (and responder(s)).

It is to be appreciated that the PRG shown in FIG. 6 is only one example of a PRG that may be employed. By way of another example, the PRG referred to as the Key Derivation Function, KDF, specified in 3GPP TS 33.220, the disclosure of which is incorporated by reference herein in its entirety, may be employed. Still other PRGs could be employed.

Figure 7:
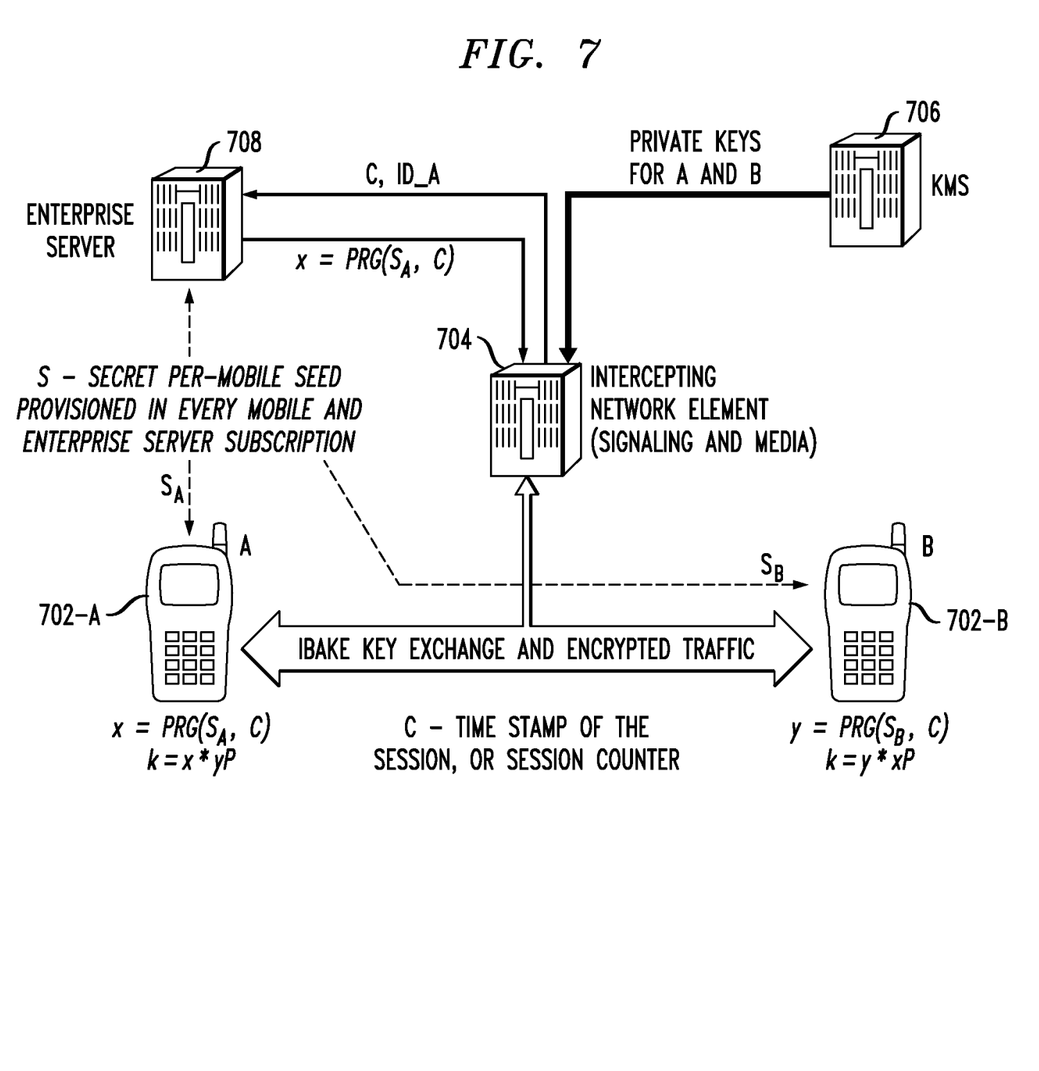
FIG. 7 illustrates a methodology for lawful discovery of session keys with secret re-generation according to an embodiment of the invention.

FIG. 7 illustrates a methodology 700 for lawful discovery of session keys with secret re-generation according to an embodiment of the invention. In particular, this embodiment illustrates interception and discovery of the security associations, including keys, between client device 702-A and client device 702-B.

Note that, as shown, enterprise server 708 provisions a secret per mobile seed S in every client device (mobile) and, to parallel this, in the enterprise server subscription associated with said client device. The value of the seed can exist for the lifetime of a client subscription, or be modified based on an enterprise policy. The method by which the seed S is provisioned in the client and in the enterprise server can use a multiplicity of known techniques that range from, for example, factory programming to bootstrapping other existing security credentials to executing standard or operator-specific provisioning procedures.

Further, as shown, the intercepting entity 704 (denoted herein as in the "intercepting network element" which is assumed to have access to both signaling and media) requests all necessary information from other network nodes, but not from the end-point devices (702-A, 702-B) themselves. Thus, the end-point devices are not aware of attempted interception. Also, this information exchange can be performed at a time in substantial advance of the actual start of the communication session, or at a later time after the session is over, depending on the interception requirements. As such, this information exchange may be referred to as "offline," i.e., not during the communication session. This dramatically reduces the complexity related to the coordination required between network elements (compared to a MitM solution as shown in FIG. 5). However, such exchange or parts thereof may alternately be performed during the communication session.

Thus, as shown, the intercepting entity 704 requests and obtains the duplicated random "secret" x associated with client device 702-A from the enterprise server 708 (note that the term secret is in quotes here for effect, i.e., while x is a secret to others and thus technically a secret, x is not a secret to the enterprise server and the intercepting entity, both which can re-generate x). That is, since the application that client 702-A uses to generate the security key is pre-configured (unbeknownst to client 702-A) with the secret random seed (S) that is associated with the identity of client 702-A when it was provided to the client by enterprise server 708, the enterprise server 708 provides the same random "secret" x to the intercepting element 704. Recall that the enterprise server may be maintained by the application provider/owner and/or the network operator. Note also that the intercepting server requests the "secret" x from the enterprise server 708 by sending C (recall session counter value C from FIG. 6, although C could alternately be the time stamp of the session) and the identifier of the client it wishes to monitor (in this example, ID_A). The identity could also be a subscription or user identity associated with the first computing device.

Further, the intercepting entity 704 is assumed to have a secure trust relationship with the KMS 706, and the KMS is under the obligation to provide the private keys associated with end-points under surveillance (in this case, client 702-A). In enterprise environments, this is more of a compliance issue rather than a regulatory obligation. Once these parameters (private keys of end-points and random "secret" x) are received, the intercepting entity 704 has all necessary information to re-generate the secret session key used by A and B in encrypting the traffic and the lawful discovery of session keys can be applied without end-points' knowledge of it.

It is important to note that neither the KMS nor the network operator/enterprise are capable of decrypting the communication stream between the end-points individually on their own, and data secrecy is preserved end-to-end. The KMS 706 is capable of decrypting the IBE-encrypted payload of IBAKE protocol messages because it has access to the private keys of the end-points 702-A and 702-B, which allows it to obtain xP and yP parameters exchanged in the IBAKE messages between end points. But the KMS 706 has no ability to recreate the desired xyP session key because it does not know either x or y. Similarly, the operator/enterprise server 708 can recreate either x or y, but has no ability to decrypt the IBE-encrypted payload of the IBAKE messages in absence of private keys of end-points 702-A and 702-B. It therefore cannot succeed in recreating the desired session key xyP either. Only the entity performing the function of lawful discovery of session keys (i.e., intercepting entity 704) that receives parameters from both the KMS 706 and the enterprise server 708 can decrypt the traffic. However, if both end-points are subscribers of the same operator/enterprise, then the enterprise server could simply discover the values of both x and y used for the session to discover the session key without collaborating with the KMS. Information from the KMS is useful only to verify that the end-points in fact used the values of x and y that were computed by the enterprise server. In such situations, it is to be noted that if such verification is not needed, then the session key can be discovered without even recording the signaling transaction which further simplifies the process of lawful discovery of security associations.

Figure 8:
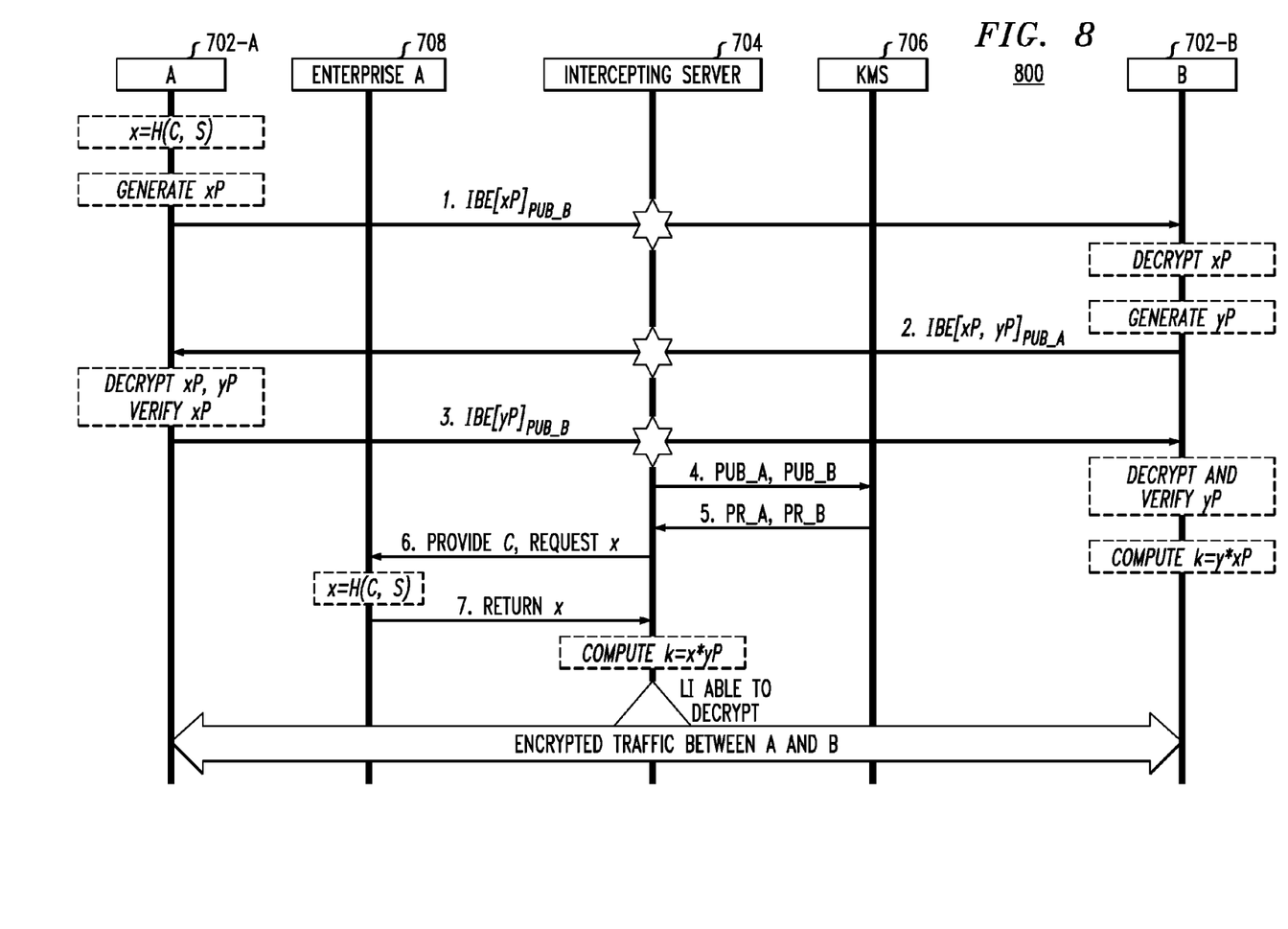
FIG. 8 illustrates a call flow for lawful discovery of session keys with secret re-generation according to an embodiment of the invention.

FIG. 8 illustrates a call flow for lawful discovery of session keys with secret re-generation according to an IBAKE embodiment of the invention. Note that, for ease of understanding and consistency, the elements in the call flow are numbered with the same reference numerals as shown in FIG. 7. Also note that the lawful security association discovery techniques of the invention are not limited to use with any particular protocol and, thus, the IBAKE protocol in this embodiment (and the conference calling embodiment to be described below in the context of FIG. 9) is used for exemplary purposes.

Note that, as shown in FIG. 8, steps 1, 2, and 3 represent typical IBAKE protocol exchange between end-point A and B. These steps are described above. If either A or B are targeted for lawful Interception, the intercepting server (intercepting entity) 704 monitors and records these signaling transactions by using the security association discovery techniques of the invention.

That is, in steps 4 and 5 in FIG. 8, the intercepting server 704 requests private keys for A and B from the KMS 706. This transaction can be done much in advance to the actual IBAKE event, when A and B become targets of interception. In such case, the A and B public and private keys are already available at the intercepting server when A and B start communicating.

Steps 6 and 7 can also be executed any time before, during, and after the actual A-B communication session. For example, if the communication session was recorded by the intercepting server in the encrypted form, the intercepting server provides the value of C (time stamp or Counter) associated with specific session to the Enterprise server 708, and receives the x associated with that session. It can then compute k as shown and decrypt the communications between A and B.

It is now further explained how the intercept is achieved in a case when end-points A and B are not only subscribers of different operators/enterprises, but also use different KMSs for providing private keys. That is, for intercepting the session that includes the targeted client A, in steps 4 and 5 in FIG. 8, the intercepting server 704 requests the private key for A from the KMS 706 associated with client A. This transaction can be done much in advance to the actual IBAKE event, when A becomes a target of interception.

Steps 6 and 7 are executed between the intercepting server 704 and the enterprise server 708 associated with the client A, and the intercepting server receives the x associated with that session.

In the case when client B is a target of interception, in steps 4 and 5 in FIG. 8, the intercepting server 704 requests the private key for B from the KMS 706 associated with client B. In steps 6 and 7 in FIG. 8, the intercepting server 704 obtains y from the enterprise server 708 associated with the client B.

The intercepting server can then decrypt information sent in step 3 in FIG. 8 and obtain the xP parameter sent by the client A. Knowing the values of y and xP, the intercepting server can then compute k as shown and decrypt the communications between A and B.

V. Improved Lawful Security Association Discovery in Group Setting

We turn now to a group setting such as a conference calling environment. In conference calling, a group of participants exchange key material and agree on a group key. In particular, Diffie-Hellman key exchange has been extended to a group setting (see, e.g., Burmester and Desmedt, "A secure and efficient conference key distribution system," Proceedings of Eurocrypt '94, vol. 950 of LNCS, pages 275-286, Springer 1995, the disclosure of which is incorporated by reference herein in its entirety), and furthermore IBAKE has been extended to address authenticated key exchange in a group setting (see, e.g., U.S. patent application identified by Ser. No. 12/549,907, filed on Aug. 28, 2009, the disclosure of which is incorporated by reference herein in its entirety). Observe that the phrase "group setting," in this example, refers to a group of users greater than two, and the protocols allow all users to exchange information in an insecure environment and to exchange a "group key" as applicable, but not limited to, conferencing systems.

Figure 9:
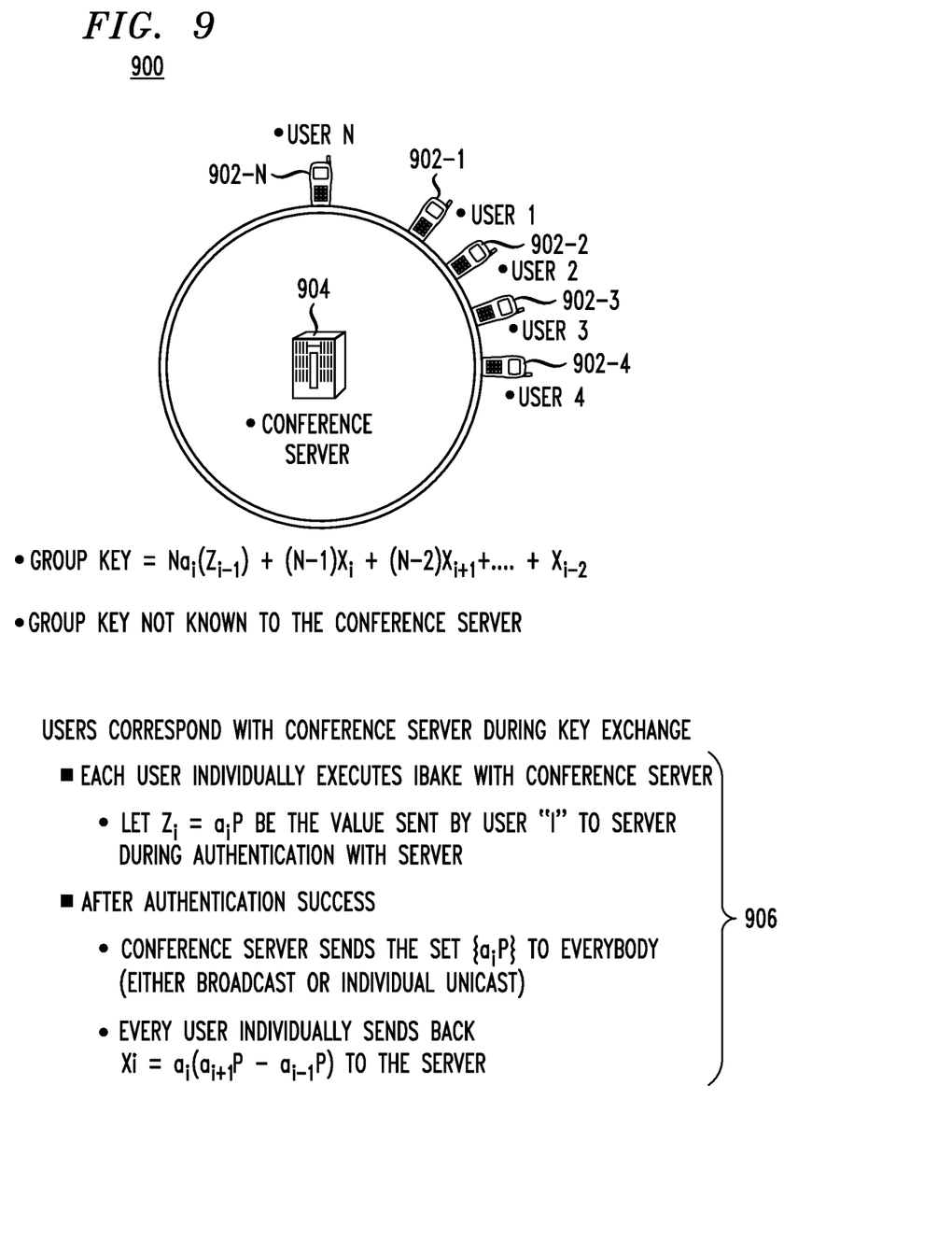
FIG. 9 illustrates a methodology for lawful discovery of session keys with secret re-generation in a conference calling environment according to an embodiment of the invention.

FIG. 9 illustrates a methodology 900 for lawful discovery of session keys with secret re-generation in a conference calling environment according to an embodiment of the invention. In particular, FIG. 9 illustrates group key exchange using IBAKE. In this setting, a central coordinating server 904 (called the conference security server) authenticates and authorizes each user (devices 902-1 through 902-N) to participate in the group key exchange. However, the group key resulting from IBAKE computations is not known to the central coordinating server 904. But yet, due to compliance and other regulatory requirements, the conference provider is often required to discover the group key.

As illustrated, each user individually executes IBAKE with the conference server. This allows the server to ensure that only authenticated and authorized participants are allowed in the call. Following this, the server shares the Diffie-Hellman key components with everyone in the call thereby allowing each participant to calculate an additional key component and share with the rest of the participants (through the server). Using elementary group theory, it can be easily observed that all participants can calculate the same group key but the conference server will be unable to determine the key. The protocol is depicted as 906 in FIG. 9.

Lawful key discovery techniques of the invention, as described in section IV above, can be extended in a straightforward manner to this setting as well. The network operator or enterprise or "over the top" application provider can use a copy of the same pseudo-random generator included in the application running on the end-point clients (902-1 through 902-N), as described above, to generate the random secret, and therefore discover the computed group key as well. This follows from the fact that using the same pseudo-random generator and discovering the parameters used to invoke the generator, allows an intercepting server (in this case, the conference server 904 or some other intercepting entity) to re-create one or more random numbers used in the protocol to calculate the group key. The details of the calculation are a straightforward exercise in elementary group theory.

VI. Illustrative Computing System

Figure 10:
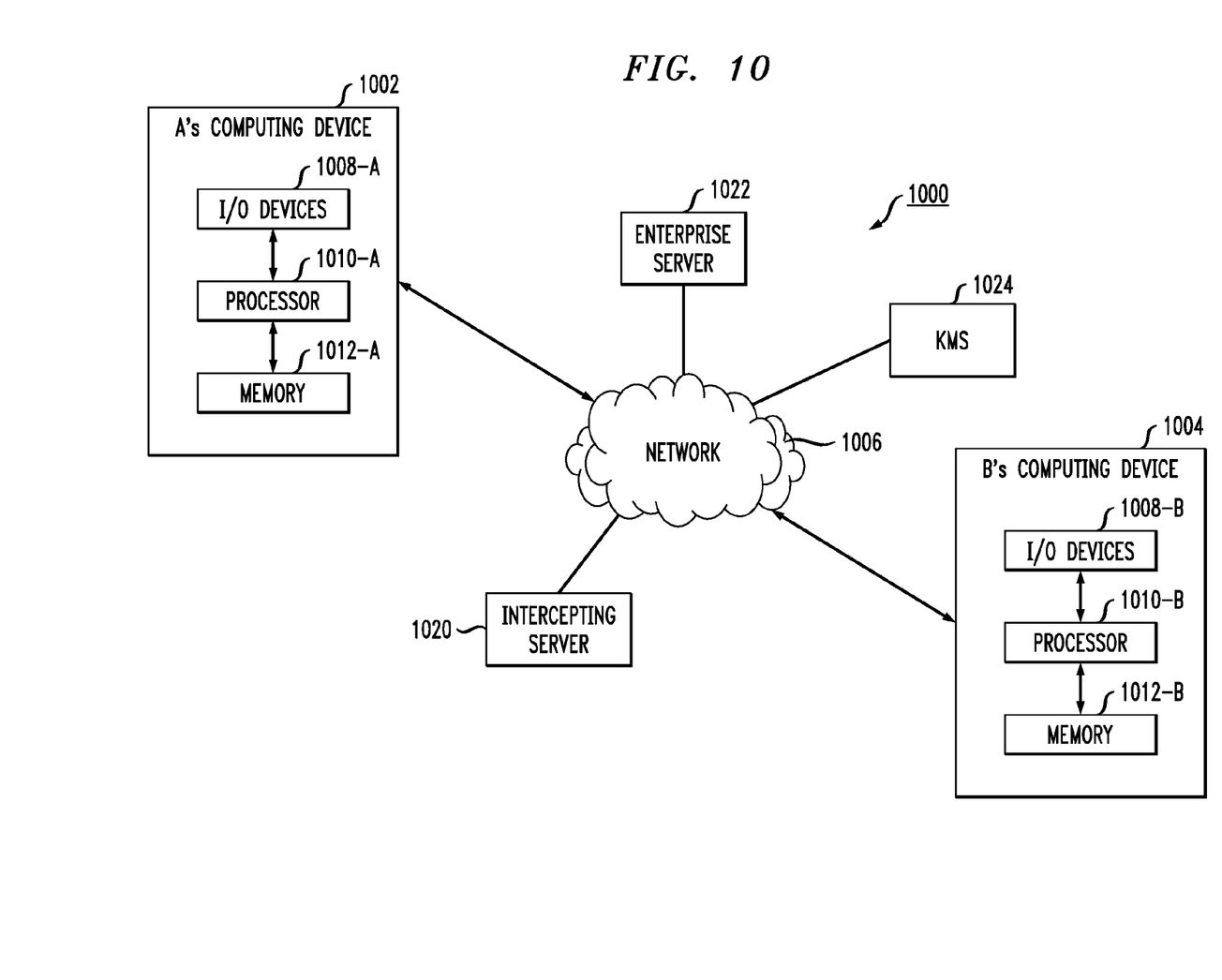
FIG. 10 illustrates a generalized hardware architecture of a data network and communication (computing) devices suitable for implementing one or more of the methodologies and protocols according to embodiments of the present invention.

FIG. 10 illustrates a generalized hardware architecture 1000 of a network environment and communication devices in the form of computing devices suitable for implementing a secure key management protocol between two entities and lawful security association discovery according to the present invention.

While FIG. 10 shows detailed subcomponents for only two of the illustrated entities, it is to be understood that other entities can have the same configuration. Thus, in terms of the secure key management protocols and lawful security association discovery described above, the two entities shown in detail may be initiator client device 702-A (a first party or A) and responder client device 702-B (a second party or B). However, KMSs (706), conference servers (904), intercepting servers (704), functional elements, additional client devices (parties) and additional servers (708) may be implemented with the same architecture as shown in a computing device of FIG. 10. Thus, by way of example, intercepting server 1020, Enterprise server 1022 and KMS 1024 are shown in FIG. 10, and are understood to have the same computing architecture as that shown in devices 1002 and 1004. However, it is to be understood that, for the sake of simplicity, all the computing devices (communication devices) that may participate in the protocols of the invention are not shown in FIG. 10.

As shown, A's computing device designated 1002 and B's computing device designated 1004 are coupled via a network 1006. The network may be any network across which the devices are able to communicate, for example, as in the embodiments described above, the network 1006 could include a publicly-accessible wide area communication network such as a cellular communication network operated by a network operator (e.g., Verizon, AT&T, Sprint). However, the invention is not limited to a particular type of network. Typically, the devices could be client machines. Examples of client devices that may be employed by the parties to participate in the protocols described herein may include, but are not limited to, cellular phones, smart phones, desktop phones, personal digital assistants, laptop computers, personal computers, etc. Recall also that, as explained above, a client could also be an application on a computing device (e.g., a smartphone). However, one or more of the devices could be servers (e.g., intercepting server, Enterprise server, KMS server, etc.). Thus, it is to be understood that the protocols and methodologies of the present invention are not limited to the case where the computing systems are client and server, respectively, but instead is applicable to any computing devices comprising the two network elements.

As would be readily apparent to one of ordinary skill in the art, the servers and clients may be implemented as programmed computers operating under control of computer program code. The computer program code would be stored in a computer readable storage medium (e.g., a memory) and the code would be executed by a processor of the computer. Given this disclosure of the invention, one skilled in the art could readily produce appropriate computer program code in order to implement the protocols described herein.

Nonetheless, FIG. 10 generally illustrates an exemplary architecture for each computer system communicating over the network. As shown, device 1002 comprises I/O devices 1008-A, processor 1010-A, and memory 1012-A. Device 1004 comprises I/O devices 1008-B, processor 1010-B, and memory 1012-B. It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). Also, memory is one example of a computer readable storage medium. In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for forming a discoverable security association between a first computing device and a second computing device, comprising:

obtaining, by the first computing device, an application program comprising a pseudo-random number generator from a fourth computing device, the application program being provisioned with a seed, the seed being associated with an identifier associated with the first computing device; and using, by the first computing device, the pseudo-random number generator to generate a secret that is used by the first computing device to compute a key for use in securing communications with the second computing device;

wherein the secret is re-computable based on knowledge of the seed and the key is re-computable based on knowledge of the secret such that a third computing device is configured to use the re-computed key to intercept communications between the first computing device and the second computing device unbeknownst to the first computing device and the second computing device;

wherein the second computing device does not have knowledge of the seed or the secret; and wherein the third computing device comprises an intercepting server and the fourth computing device comprises a server operated by a provider.

2. The method of claim 1, wherein the application program invokes the pseudo-random generator to generate the secret based on the seed.

3. The method of claim 2, wherein the pseudo-random generator uses the seed and a value to generate the secret.

4. The method of claim 3, wherein the value is a deterministic and monotonically increasing value.

5. The method of claim 4, wherein the value comprises one of a time stamp value or a counter value.

6. The method of claim 1, wherein the first computing device and the second computing device respectively comprise clients.

7. The method of claim 1, wherein the provider comprises one of an application provider, a network provider, and an enterprise.

8. The method of claim 1, wherein the third computing device comprises a conference server wherein the key is a group key used by participants in a conference call.

9. The method of claim 1, wherein the seed comprises a set of numbers comprising at least one random number.

10. The method of claim 1, wherein the key comprises a session key.

11. The method of claim 1, wherein the key is a result of a mutually authenticated key exchange.

12. The method of claim 11, wherein the mutually authenticated key exchange comprises an identity based authenticated key exchange.

13. A method for discovering a security association formed between a first computing device and a second computing device, comprising:

obtaining, by a third computing device, a secret from a fourth computing device, wherein the secret is the same secret generated by the first computing device, wherein the first computing device generated the secret utilizing an application program provided thereto by the fourth computing device, the application program comprising a pseudo-random number generator provisioned with a seed associated with an identifier associated with the first computing device, wherein the first computing device used the seed to generate the secret and used the secret to compute a key for use in securing communications with the second computing device, and wherein the second computing device does not have knowledge of the seed or the secret;

requesting, by the third computing device from a fifth computing device, one or more of respective private keys associated with the first computing device and the second computing device;

re-computing, by the third computing device, the key based on the secret in order to intercept communications between the first computing device and the second computing device unbeknownst to the first computing device and the second computing device;

wherein the third computing device comprises an intercepting server, the fourth computing device comprises a server operated by a provider and the fifth computing device comprises a key management server.

14. The method of claim 13, wherein the third computing device provides a value associated with an identity associated with the first computing device to the fourth computing device such that the fourth computing device returns the secret needed by the third computing device to re-compute the key in order to intercept communications between the first computing device and the second computing device.

15. The method of claim 13, wherein the third computing device also uses at least one of the private keys to re-compute the key.

16. The method of claim 13, wherein the first computing device and the second computing device respectively comprise clients.

17. The method of claim 13, wherein the provider comprises one of an application provider, a network provider, and an enterprise.

18. The method of claim 13, wherein the key is a result of an identity based authenticated key exchange.

19. The method of claim 13, wherein the third computing device comprises a conference server wherein the key is a group key used by participants in a conference call.

20. Apparatus for forming a discoverable security association between a first computing device and a second computing device, comprising:

a memory; and a processor device coupled to the memory and configured such that:

the first computing device obtains an application program comprising a pseudo-random number generator from a fourth computing device, the application program being provisioned with a seed, the seed being associated with an identifier associated with the first computing device; and the first computing device uses the pseudo-random number generator to generate a secret that is used by the first computing device to compute a key for use in securing communications with the second computing device;

wherein the secret is re-computable based on knowledge of the seed and the key is re-computable based on knowledge of the secret such that a third computing device is configured to use the re-computed key to intercept communications between the first computing device and the second computing device unbeknownst to the first computing device and the second computing device; wherein the second computing device does not have knowledge of the seed or the secret; and wherein the third computing device comprises an intercepting server and the fourth computing device comprises a server operated by a provider.

21. Apparatus for discovering a security association formed between a first computing device and a second computing device, comprising:

a memory; and a processor device coupled to the memory and configured such that:

a third computing device obtains a secret from a fourth computing device, wherein the secret is the same secret generated by the first computing device, wherein the first computing device generated the secret utilizing an application program provided thereto by the fourth computing device, the application program comprising a pseudo-random number generator provisioned with a seed associated with an identifier associated with the first computing device, wherein the first computing device used the seed to generate the secret and used the secret to compute a key for use in securing communications with the second computing device;

the third computing device requests from a fifth computing device one or more of respective private keys associated with the first computing device and the second computing device; and the third computing device re-computes the key based on the secret in order to intercept communications between the first computing device and the second computing device unbeknownst to the first computing device and the second computing device, and wherein the second computing device does not have knowledge of the seed or the secret;

wherein the third computing device comprises an intercepting server, the fourth computing device comprises a server operated by a provider and the fifth computing device comprises a key management server.

22. The method of claim 1, wherein the seed provided to the first computing device is different than a seed provided to the second computing device such that the secret generated by the first computing device is different than a secret generated by the second computing device.

* * * * *